(12) United States Patent
Fujinami et al.

(10) Patent No.: US 6,168,425 B1
(45) Date of Patent: Jan. 2, 2001

(54) METHOD FOR FUSION TREATING A SOLID WASTE FOR GASIFICATION

(75) Inventors: Shosaku Fujinami; Kazuo Takano; Masaaki Irie; Tetsuhisa Hirose; Takahiro Oshita, all of Tokyo (JP)

(73) Assignee: Ebara Corporation, Tokyo (JP)

( * ) Notice: Under 35 U.S.C. 154(b), the term of this patent shall be extended for 0 days.

(21) Appl. No.: 09/202,913

(22) PCT Filed: Jun. 25, 1997

(86) PCT No.: PCT/JP97/02191

§ 371 Date: Aug. 16, 1999

§ 102(e) Date: Aug. 16, 1999

(87) PCT Pub. No.: WO97/49953

PCT Pub. Date: Dec. 31, 1997

(30) Foreign Application Priority Data

Jun. 25, 1996 (JP) .................................................. 8-184013

(51) Int. Cl.[7] .................................................... F27B 15/00
(52) U.S. Cl. .......................... 432/58; 48/197 R; 423/359
(58) Field of Search ............................... 432/15, 58, 105, 432/106; 110/243, 244, 245, 346, 347; 106/744; 422/144, 145, 146; 48/197 R, 203, 209; 423/359

(56) References Cited

U.S. PATENT DOCUMENTS

| | | |
|---|---|---|
| 4,448,589 | 5/1984 | Fan et al. . |
| 4,676,177 | 6/1987 | Engstrom . |
| 4,762,074 | 8/1988 | Sórensen . |
| 4,823,740 | 4/1989 | Ohshita et al. . |
| 4,938,170 | 7/1990 | Ohshita et al. . |
| 5,170,725 | 12/1992 | Sass et al. . |
| 5,425,317 | 6/1995 | Schaub et al. . |
| 5,620,488 | 4/1997 | Hirayama et al. . |
| 5,725,614 | 3/1998 | Hirayama et al. . |
| 5,858,033 | 1/1999 | Hirayama et al. . |

FOREIGN PATENT DOCUMENTS

| | | |
|---|---|---|
| 2729764 | 1/1979 | (DE) . |
| 4435349C1 | 5/1996 | (DE) . |
| 0594231A1 | 4/1994 | (EP) . |
| 0 601 584 | 6/1994 | (EP) . |
| 0676464A2 | 10/1995 | (EP) . |
| 0676464A3 | 10/1995 | (EP) . |
| 2660415 | 10/1991 | (FR) . |
| 2710967 | 4/1995 | (FR) . |
| 54-57371 | 5/1979 | (JP) . |
| 56-003810 | 1/1981 | (JP) . |
| 1-52654 | 11/1989 | (JP) . |
| 2-147692 | 6/1990 | (JP) . |
| 3-241214 | 10/1991 | (JP) . |
| 5-26421 | 2/1993 | (JP) . |
| 5-196218 | 8/1993 | (JP) . |
| 6-307614 | 11/1994 | (JP) . |
| 7-91631 | 4/1995 | (JP) . |
| 7-332614 | 12/1995 | (JP) . |

*Primary Examiner*—Denise L. Ferensic
*Assistant Examiner*—Gregory A. Wilson
(74) *Attorney, Agent, or Firm*—Wenderoth, Lind & Ponack, L.L.P.

(57) ABSTRACT

The present invention relates to a method for treating solid wastes such as refuse-derived fuel or biomass wastes by pyrolysis gasification in a fluidized-bed gasification furnace 1, and then high-temperature combustion in a melting furnace 9. A primary combustion in a fluidized-bed 4 of the gasification furnace is carried out at a temperature of 600±50° C., a secondary combustion in a freeboard 3 of the gasification furnace is carried out at a temperature of 725±75° C., and a tertiary combustion in the melting furnace 9 is carried out at a temperature higher than a fusion temperature of ashes by 50 to 100° C. An oxygen ratio (a ratio of an amount of oxygen supplied for combustion to a theoretical amount of oxygen for combustion) in the primary combustion is in the range of 0.1 to 0.3, an oxygen ratio in the secondary combustion is in the range of 0.05 to 0.1, an oxygen ratio in the tertiary combustion is in the range of 0.9 to 1.1, and a total oxygen ratio is about 1.3.

8 Claims, 4 Drawing Sheets

F I G. 4

METHOD FOR FUSION TREATING A SOLID WASTE FOR GASIFICATION

TECHNICAL FIELD

The present invention relates to a method for treating solid wastes or fuel derived from solid wastes such as municipal wastes, refuse-derived fuel, solid-water mixture, plastic wastes, FRP wastes, biomass wastes, shredder dust (automobile wastes, electric appliance wastes or the like) by gasification and slagging combustion system.

The refuse-derived fuel is produced by crushing and classifying municipal wastes, adding quicklime to the classified municipal wastes, and compacting them to shape. The solid water mixture (SWM) is produced by crushing municipal wastes, converting them into a slurry by adding water, and converting the slurry under a high pressure into an oily fuel by hydrothermal reaction. The FRP is fiber-reinforced plastics. The biomass wastes include wastes from water works or sewage plants (misplaced materials, sewage sludges), agricultural wastes (rice husk, rice straw), forestry wastes (sawdust, bark, lumber from thinning), industrial wastes (pulp-chip dust), and construction wastes.

BACKGROUND ART

Currently, 75% of municipal wastes is treated by incineration in a fluidized-bed furnace or a Stoker furnace. However, there has long been desired the waste treatment technology suitable for environmental conservation in place of incineration treatment from the following reasons.

1) In order to prolong landfill sites, make ashes harmless, or utilize ashes to materials for civil engineering or construction, needs for ash melting have rapidly been raised.

2) It is necessary to cope with strict restrictions on Dioxins which are expected in the near future.

3) In the conventional method which deals with individually or separately the subject matters of decomposition of Dioxins or ash melting, the rise in construction cost or operation cost of the treatment facilities has been inevitable. On the other hand, it is possible to make scale-down of the gas treatment facilities if the amount of exhaust gas is reduced by a low oxygen-ratio combustion.

4) There has been developing a strong tendency to make use of wastes to generate electric power effectively because waste can be regarded as energy source.

Under these circumstances, new waste treatment systems which incorporate a gasification process have been developed, and some of them which are ahead of others include a system having a vertical shaft furnace as a gasification furnace (hereinafter referred to as a "S system") and a system having a rotary kiln as a gasification furnace (hereinafter referred to as a "R system").

Figure 3:
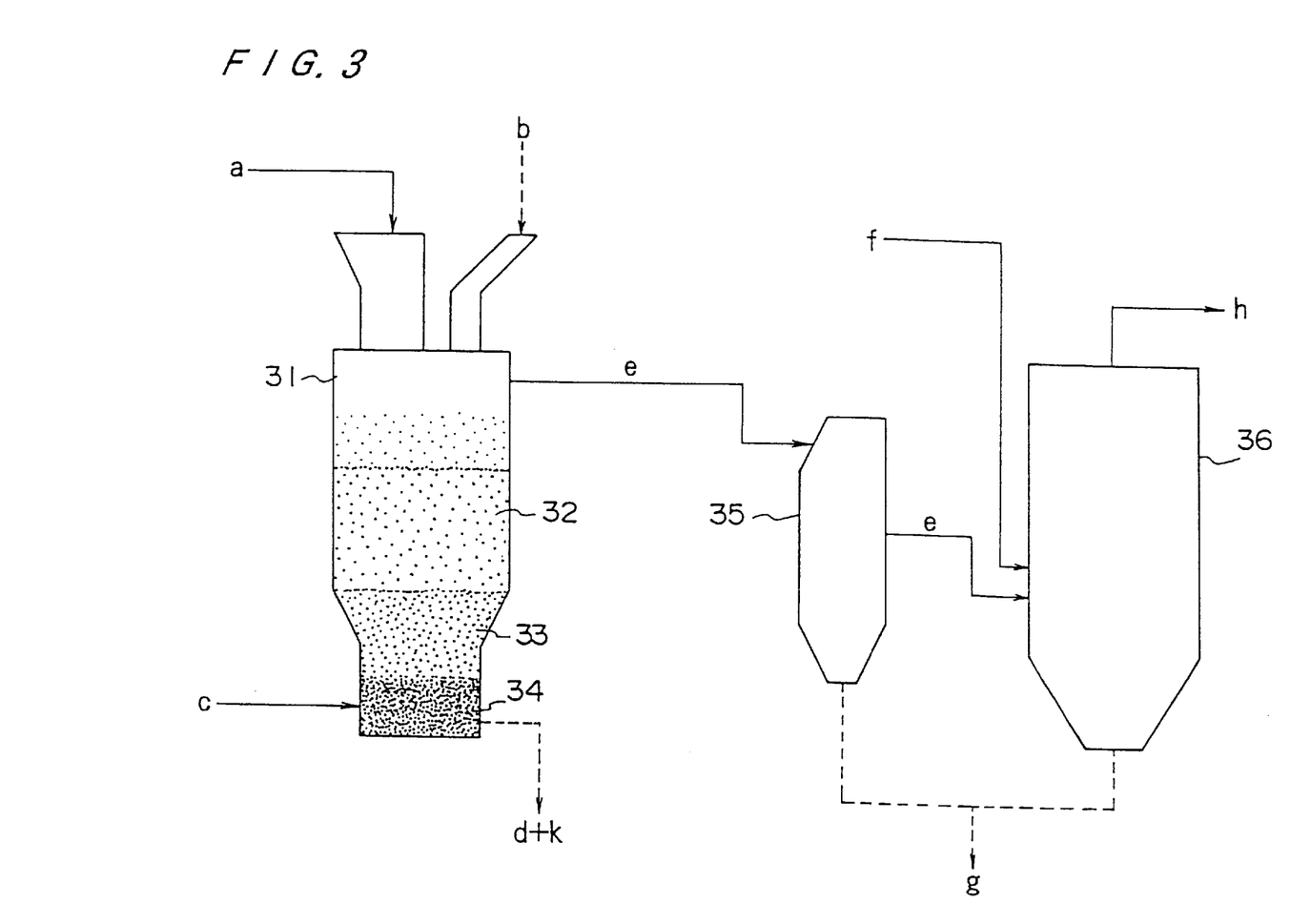
FIG. 3 is a schematic diagram of S system.

FIG. 3 schematically shows the S system. As shown in FIG. 3, the S system has a furnace 31 in which a predrying zone 32, a pyrolyzing zone 33, and a combusting/melting zone 34 are formed. The S system further comprises a dust collector 35 and a combustion chamber 36. In FIG. 3, the symbols, "a", "b", "c" and "d" represent wastes, coke+limestone, oxygen-enriched air, and slag, respectively. Further, the symbols, "e", "f", "g", "h" and "k" represent generated gas, air, dust, exhaust gas, and metal, respectively.

As shown in FIG. 3, in the melting furnace 31, the predrying zone 32 at a temperature ranging from 200 to 300° C., the pyrolyzing zone 33 at a temperature ranging from 300 to 1000° C., and the combusting/melting zone 34 at a temperature of 1500° C. or higher are formed as accumulated layers. Wastes "a" charged into an upper part of the furnace descend in the furnace while exchanging heat with gas which has been generated in the lower zones. The generated gas "e" discharged from the upper part of the melting furnace 31 passes through the dust collector 35, and is supplied to the combustion furnace 36 and combusted therein at a temperature of about 900° C. Carbonous materials generated in the pyrolyzing zone 33 and the charged (coke+limestone) "b" descend together and reach the combusting/melting zone 34, and are combusted at a high temperature by oxygen-enriched air "c" supplied from tuyeres. Slag "d" and metal "k" which have been melted because of a high-temperature are discharged from the bottom of the furnace.

Figure 4:
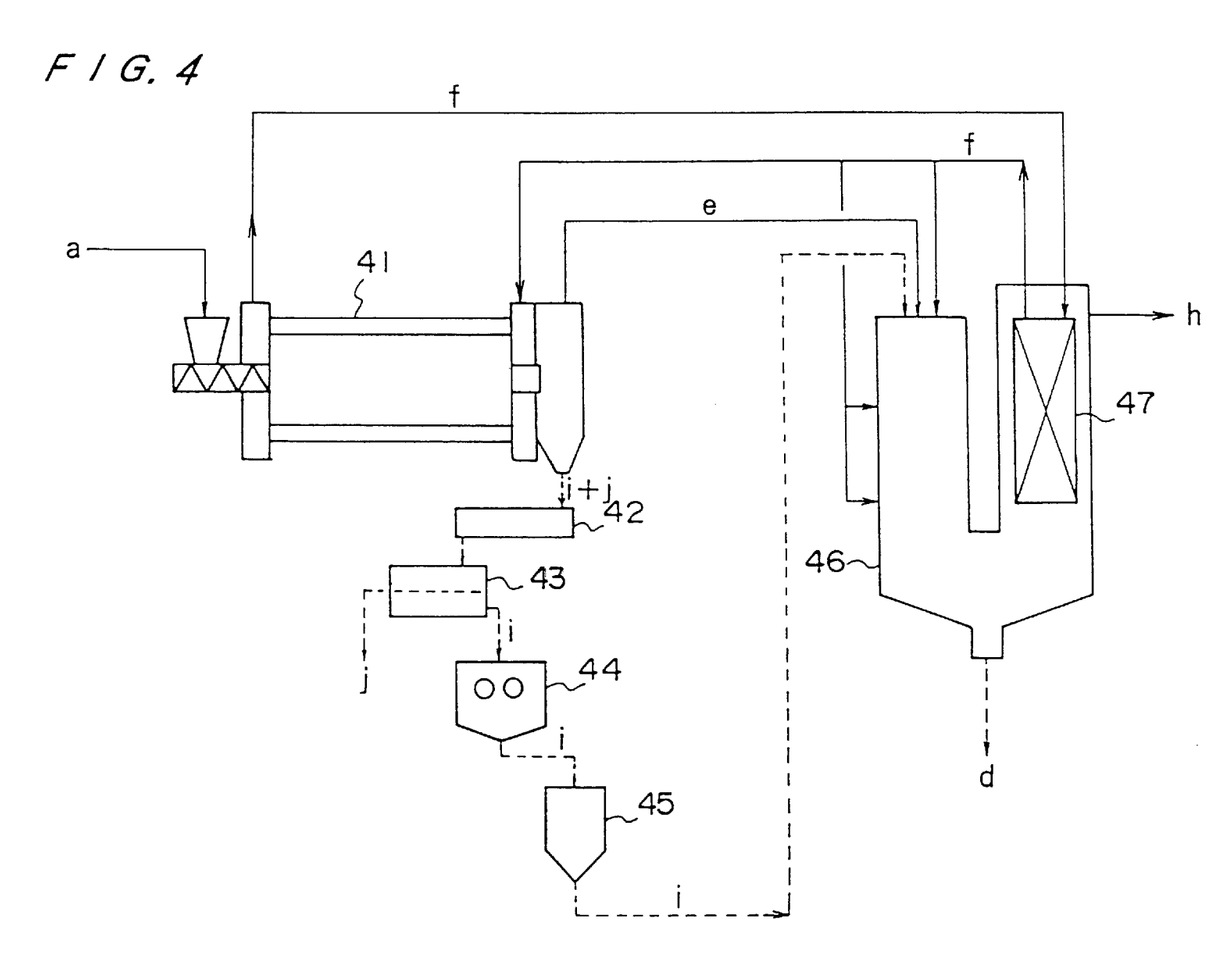
FIG. 4 is a schematic diagram of R system.

FIG. 4 schematically shows the R system. The R system has a pyrolyzing drum 41. A cooler 42, a separator 43, a pulvelizer 44 and a silo 45 are provided adjacent to the pyrolyzing drum 41. The R system further comprises a swirling-type melting furnace 46 and a high-temperature air heater 47. In FIG. 4, the symbols, "a", "f", "i" and "j" represent wastes, air, char, and incombustibles, respectively. Further, the symbols, "e", "d", and "h" represent generated gas, slag, and exhaust gas, respectively.

Wastes "a" which have been crushed are supplied into the pyrolyzing drum 41 which is indirectly heated by the high-temperature air "f", and are pyrolyzed and gasified slowly at a temperature of about 450° C. under a non-oxygen atmosphere in the pyrolyzing drum 41 while they are stirred by rotation of the pyrolyzing drum 41. The generated gas "e" discharged from the pyrolyzing drum 41 is supplied to the subsequent swirling-type melting furnace 46.

On the other hand, solid char "i" and incombustibles "j" are taken out from the pyrolyzing drum 41 and cooled in the cooler 42, and then are classified into large-sized incombustibles "j" and small-sized char "i" by the screen separator 43. The char "i" pulverized by the pulverizer 44 is stored in the silo 45, and then supplied to the melting furnace 46. In the melting furnace 46, the pulverized char "i" and the generated gas "e" from the pyrolyzing drum 41 are combusted at a high temperature of about 1300° C. Molten slag "d" is discharged from the bottom of the melting furnace 46.

The S and R systems have various disadvantages of their own as described below. In the shaft furnace of the S system, the operating cost is high and the amount of carbon dioxide discharged from the furnace increases because auxiliary fuel such as coke is required for forming the melting zone at the furnace bottom at a high temperature ranging from 1700 to 1800° C. Since metals contained in the wastes are melted altogether, the recovered metals become alloy-like mixed metal, and hence cannot be recycled as ingot of each kind of metal. It is difficult for the furnace which belongs to fixed-bed type furnaces to allow gas to ascend uniformly through the space among wastes because the wastes, in various different shapes, are stacked in layers in the furnace. This tends to cause the drift of the gas flowing through the layers. Therefore, the furnace cannot be operated stably, and excessive fluctuations of furnace pressure, gas generating rate, or gas composition are unavoidable.

On the other hand, since the rotary furnace of the R system is indirectly heated and has poor thermal conductivity, the furnace size is unavoidably large. This presents a problem in scale-up of the furnace. The generated char is taken out together with other incombustibles from the rotary furnace, and after cooling large-sized incombustibles are separated and removed therefrom. Thereafter, char is pulverized and stored in a hopper, and then a required amount of char is taken out from the hopper, conveyed and supplied to the melting furnace. Thus, the R system needs complicated facilities for handling char, resulting in rise in plant cost as well as obstacle in a stable operation. Further, heat loss caused by cooling of the char or heat radiation from the char is not desirable from the standpoint of effective energy utilization.

It is therefore an object of the present invention to provide a method for treating solid wastes by gasification and slagging combustion system which does not require auxiliary fuel such as coke, can reduce discharge of carbon dioxide, can recover metals such as iron, copper or aluminum in an unoxidized and refined condition, has a furnace which is compact in size and capable of being scaled up easily, and does not require facilities for pulverizing char and handling pulverized char.

DISCLOSURE OF INVENTION

In order to achieve the above object, the R system has been studied carefully and thoroughly, and a method which uses a fluidized-bed furnace as a gasification furnace (hereinafter referred to as "F system") has been invented. Further, a number of experiments have been made, and it has been found that a total of three-stage combustions of wastes carried out in the gasification furnace and the melting furnace are the best. To be more specific, after a primary combustion is carried out in a fluidized-bed of a gasification furnace, a secondary combustion is carried out in a freeboard of the gasification furnace, and then a tertiary combustion is carried out in a subsequent melting furnace. Ash content is converted into molten slag at a high temperature of 1300° C. by the tertiary combustion, and molten slag is discharged continuously from the bottom of the melting furnace. As a result of various experiments, operational conditions in respective furnaces in the F system have been established.

Regarding the temperature in the furnaces, it was found that the primary combustion in the fluidized-bed of the gasification furnace should be made at a temperature of 600±50° C., preferably 600±30° C., the secondary combustion in the freeboard should be made at a temperature of 725±75° C., and the tertiary combustion in the melting furnace should be made at a temperature higher than a fusion temperature of ashes by 50 to 100° C. In the case where temperature in the fluidized-bed of the gasification furnace is 500° C. or lower, the reaction rate of pyrolysis gasification becomes slow, and the amount of generated gas is reduced and undecomposed materials tend to remain in the fluidized-bed. As a result, the amount of combustibles, i.e., gas, tar and char supplied to the melting furnace decreases, and it becomes difficult to maintain combustion temperature in the melting furnace.

On the other hand, in the case where temperature in the fluidized-bed of the gasification furnace is 650° C. or higher, the reaction rate of gasification becomes excessively fast, and fluctuation accompanied by the combustibles feeding rate to the melting furnace causes fluctuation in gas generation to thus affect combustion in the melting furnace adversely. Among metals contained in the wastes, whose fusion temperatures are higher than the fluidized-bed temperature, such a metal can be recovered together with a fluidized medium from the bottom of the gasification furnace. In particular, in order to recover aluminum having a melting point of 660° C., the gasification temperature in the fluidized-bed is required to be set at lower than 650° C. In the case where the gasification temperature is higher than a melting point of aluminum, most of aluminum is vaporized, and then aluminum is collected as a mixture with ashes in the equipment downstream of the melting furnace. However, most of recovered aluminum is oxidized, and hence worthless.

It was found that if the secondary combustion in the freeboard of the gasification furnace was carried out at a temperature higher than 800° C., ashes softened due to local high-temperature combustion in the duct between the gasification furnace and the melting furnace to cause plugging of the duct. The purpose of the secondary combustion is to reduce load of the tertiary combustion in the melting furnace and make use of a space of the freeboard. Combustion temperature in the melting furnace could be measured by a radiation pyrometer. In case that the combustion temperature was higher than a measured fusion temperature of ashes by 50 to 100° C., discharge of slag was made smoothly. It is not desirable that the combustion temperature in the melting furnace is higher than a fusion temperature of ashes by 100° C. or higher because the castable living in the melting furnace is damaged severely.

In the F system, sand such as silica sand is used as a fluidized medium, and the fluidized medium is selected from sand whose mean particle diameter is in the range of 0.4 to 0.8 mm. If the mean particle diameter of sand is 0.4 mm or less, the amount of treated wastes per a bed area is small and is not economical. If the mean particle diameter of sand is 0.8 mm or more, the space velocity of gas blowing up from the fluidized-bed is large, and the supply of wastes from a position above the fluidized-bed becomes difficult. This is because fine or light material in the wastes does not drop onto the fluidized-bed, but is carried with gas. Further, the amount of char carried with gas increases. The gasification furnace of the F system is characterized by the use of the fluidized-bed whose height is rather small, and it is desirable that the height of the fluidized-bed (in stationary condition) is in the range of 1.0 to 1.5 times the inner diameter of the fluidized-bed. The space velocity of air or oxygen-containing gas which is supplied to the fluidized-bed for a primary combustion or fluidization is preferably about six times of Umf (minimum fluidization velocity) of the fluidized medium. Thus, the flow rate of gas required per one square meter of bed is in the range of 400 to 1700 $Nm^3$/hr. The heat required for pyrolysis gasification of wastes is produced by partial combustion, and is quickly and efficiently transferred from the fluidized medium to wastes. This heat supply method is generally called "direct heating type", and it is obvious that the direct heating type furnace is superior to the indirect heating type furnace in compactness and thermal efficiency.

Char produced in pyrolysis gasification reaction caused by a primary combustion is pulverized by partial combustion and a stirring action of the fluidized medium. By using hard silica sand as a fluidized medium, the pulverization of char is further promoted. Since the char is porous, its specific density is in the range of 0.1 to 0.2 and is small. Therefore, a fluidized-bed of char is formed on the fluidized-bed of sand. If this state is left as it is, the fluidized-bed of char reaches the uppermost position of the freeboard, and the feed of wastes to the gasification furnace has some difficulties. Since the supply port of wastes in the gasification furnace is provided above the fluidized-bed of sand, even if negative pressure of about −20 mmAq is kept at the upper part of the freeboard, positive pressure is developed at the supply port and therearound if the supply port is soaked in the fluidized-bed of char. As a result, there is a danger that combustible gas leaks toward an outside of the furnace through a feed equipment. This is not desirable in a standpoint of safety and deodorization. As a result of study, there has been proposed in the Japanese patent application No. 7-349428 a method for preventing deposition of char by supplying air or oxygen-containing gas to a position immediately above the fluidized-bed of sand to thereby promote combustion of char. It was found that in the case where the amount of air or oxygen-containing gas was set such that the space velocity of gas in the freeboard was 0.7 m/sec or more, preferably 1.0 m/sec or more, fine char having a diameter of 1 mm or smaller could be easily supplied to the subsequent melting furnace by pneumatic transportation. It is preferable that the supply position of air or oxygen-containing gas is within a height of 1000 mm from a surface of the fluidized-bed of sand. In this manner, the freeboard achieves functions for not only classification by upward gas flow but also secondary combustion, and hence it is possible to promote combustion of char in the freeboard.

The object of the tertiary combustion in the melting furnace is to complete combustion of wastes at a low oxygen ratio, convert ash content into molten slag, and decompose Dioxins and Dioxin precursors. The tertiary combustion is performed by supplying oxygen-containing gas. AS described above, the combustion temperature in the melting furnace is set to a fusion temperature of ashes plus 50 to 100° C., and further it was found that in order to decompose Dioxins and Dioxin precursors completely, it was necessary to retain a high-temperature combustion of 1300° C. or higher for 0.5 second or more. In the F system, because there is no high-temperature part such as a temperature ranging from 1700 to 1800° C. unlike the S system, auxiliary fuel such as coke is not required. The gas supplied for the primary, secondary and tertiary combustions is properly selected from air, oxygen-enriched air, or oxygen depending on quality of wastes or property of generated gas to be obtained. The melting furnace comprises combustion chambers and a subsequent slag separation chamber. It was found that in order to separate gas and slag from each other efficiently, the ascending speed of gas in the slag separation chamber was required to be 6 m/sec or less.

The F system is designed such that a low-oxygen ratio combustion is carried out, i.e., a total oxygen ratio is about 1.3. Here, the oxygen ratio is defined as a ratio of the amount of oxygen used for combustion to the theoretical amount of oxygen for combustion. It was found by experiments that the oxygen ratio was preferably in the range of 0.1 to 0.3 in the primary combustion in the fluidized-bed of the gasification furnace, 0.05 to 0.1 in the secondary combustion in the freeboard of the gasification furnace, 0.9 to 1.1 in the tertiary combustion in the melting furnace. That is, the respective combustions are carried out at an oxygen ratio of 0.1 to 0.3 in the fluidized-bed of the fluidized-bed gasification furnace, at an oxygen ratio of 0.05 to 0.1 in the freeboard, and at an oxygen ratio of 0.9 to 1.1 in the melting furnace, and the total oxygen ratio in both furnaces is about 1.3.

The F system is a combination of the fluidized-bed gasification furnace and the melting furnace (preferably a swirling-type melting furnace). This system has the following advantages:

1. Because combustion is performed at a low oxygen ratio of about 1.3, the amount of exhaust gas is greatly reduced.

2. Dioxins are not contained in the exhaust gas and ashes.

3. Ash content can be recovered as harmless slag from which heavy metals or the like are not eluted out. Therefore, a life of reclaimed land can be prolonged, and the recovered slag can be utilized as construction and civil engineering materials.

4. Since energy of gas, char and tar produced in the gasification furnace can be effectively utilized for ash melting, auxiliary fuel is not required, and the operating cost can be reduced.

5. Since functions of Dioxin decomposition and ash melting are incorporated in the system, the facility becomes compact as a whole, and the construction cost thereof is lower than that of the conventional incineration facility to which the above two functions are added.

6. Metals such as iron, copper or aluminum can be recovered in an unoxidized and clean condition suitable for recycling.

As is apparent from the above description, the F system which uses a fluidized-bed furnace as a gasification furnace is superior to the S system in that operation of the system is easy, auxiliary fuel such as coke is not required, the amount of carbon dioxide discharged from the system does not increase, and metals such as iron, copper or aluminum can be recovered in an unoxidized and refined condition. Further, the F system is superior to the R system in that the gasification furnace is compact, there is no mechanical moving parts, the scale up of the furnace can be easily made, and facilities related to pulverizing and handling char (carbonous material) are not required.

Among conventional incineration facilities, there are some facilities which do not have an ash melting facility or some facilities around which an ash melting facility is not located, and those facilities have great difficulty in treating the bottom ash and fly ash discharged from the furnace and waste heat boiler. Those ashes discharged from such incineration facilities can be supplied to the F system and treated together with other solid wastes, and slag produced in the system can be effectively utilized as high-quality slag containing no unburned matter.

BEST MODE FOR CARRYING OUT THE INVENTION

A method for treating solid wastes by gasification and slagging combustion system according to an embodiment of the present invention will be described with reference to drawings. The following embodiment is only one example, and it should be understood that the scope of the invention is not limited to this embodiment.

Figure 1:
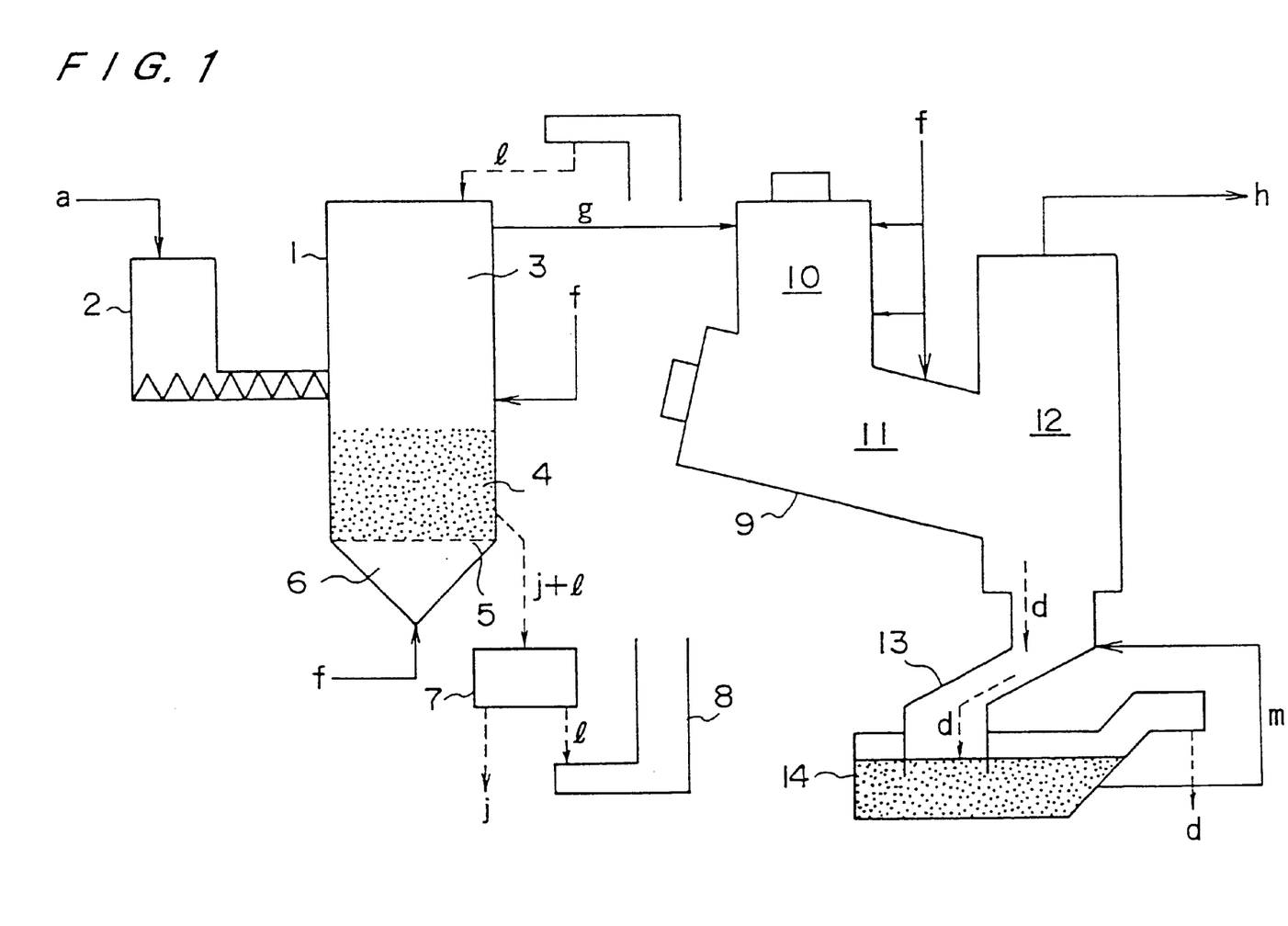
FIG. 1 is a schematic diagram of an apparatus for carrying out a method for treating solid wastes by gasification and slagging combustion system according to the present invention.

FIG. 1 is a schematic diagram of an apparatus for carrying out the method for treating solid wastes by gasification and slagging combustion system according to the present invention. In FIG. 1, the reference numeral 1 represents a fluidized-bed gasification furnace, and wastes are supplied to the fluidized-bedgasificationfurnacelbyaconstantfeeder2. The fluidized-bed gasification furnace has a freeboard 3, a fluidized-bed 4, an air diffusion plate 5 and an air chamber 6 therein. A separating device 7 and a bucket conveyor 8 are provided adjacent to the fluidized-bed gasification furnace 1.

The gas, tar and char produced in the fluidized-bed gasification furnace 1 are supplied altogether to a subsequent swirling-type melting furnace 9. In the swirling-type melting furnace, a primary combustion chamber 10, a secondary combustion chamber 11 and a slag separation chamber 12 are formed. The reference numeral 13 represents a slag quenching trough, and the reference numeral 14 represents a slag conveyor. In FIG. 1, the symbols, "a", "f", "l", and "j" represent wastes, air, sand, and incombustibles, respectively. Further, the symbols, "g", "d", "m", and "h" represent generated gas, slag, circulating water, and exhaust gas, respectively.

The wastes "a" which, if necessary, have been pretreated, e.g. crushed or classified, and then supplied at a constant rate by the screw-type constant feeder 2 to the fluidized-bed gasification furnace 1. Air "f" for a primary combustion is supplied to the air chamber 6 of the gasification furnace 1, and then blown upwardly through the air diffusion plate 5 for thereby fluidizing sand "l" charged on the air diffusion plate. The sand used as a fluidized medium is silica sand. The wastes "a" supplied onto the fluidized-bed descends in the fluidized-bed, and are contacted with the air "f" for a primary combustion in the fluidized-bed which is kept at a temperature of 600±50° C., preferably 600±30° C., whereby the wastes "a" are rapidly pyrolyzed and gasified.

In order to prevent incombustibles from being deposited in the fluidized-bed, a mixture of incombustibles "j" and sand "l" is continuously or intermittently discharged from the bottom of the gasification furnace 1. Large-sized incombustibles "j" are separated and removed therefrom by the separating device 7 such as a trommel or the like. Although the discharged incombustibles contain metals such as iron, copper or aluminum, the inside of the furnace is in a reducing atmosphere, and hence metals can be recovered in an unoxidized and refined condition because they are polished by sand. This is very important technology for recycling metals. The sand "l" from which large-sized incombustibles "j" are removed is conveyed upwardly by the bucket conveyor 8 and returned to the gasification furnace 1.

The wastes charged into the gasification furnace are converted into gas, tar and char by pyrolysis gasification reaction. The char which is carbonous material is dispersed in the fluidized-bed and fluidized together with sand, and is gradually pulverized by oxidization or stirring action of the fluidized-bed. The pulverized char forms a fluidized-bed of char on the fluidized-bed of the sand. Air "f" for a secondary combustion is blown into a portion immediately above the fluidized-bed of sand, a secondary combustion is carried out at a temperature of 725±75° C., and the pulverized char is carried with the upward flow of gas. In this manner, the char conveyed by the gas flow is discharged together with gas and tar from the gasification furnace 1, and supplied to the primary combustion chamber 10 of the swirling-type melting furnace 9, in which they are mixed with preheated air "f" for a tertiary combustion in an intense swirling flow and rapidly combusted at a high temperature of 1300° C. or higher. The combustion is completed in the secondary combustion chamber 11, and combustion exhaust gas "l" is discharged from the upper part of the slag separation chamber 12. Because of the high-temperature combustion, ash content contained in the char is converted into slag mist. The slag "d" which is trapped on an inner wall of the primary combustion chamber 10 due to the centrifugal forces of the swirling flow flows down on the inner wall and enters the secondary combustion chamber 11, and then the slag "d" flows down from the secondary combustion chamber 11 to the slag separation chamber 12 and is discharged from the bottom of the slag separation chamber 12 to the slag quenching trough 13.

The slag quenching trough 13 has such a structure that water flows on a slide, and is arranged to allow safety measure to be taken so that even if large lump of slag drops, steam explosion does not occur. The slag "d" which flows down in the slag quenching trough 13 is quenched by being contacted with the circulating water "m" which flows rapidly in the trough, thus forming granulated slag which enters the slag conveyer 14. Thereafter, the granulated slag is conveyed by the slag conveyor 14 to the outside of the system. The granulated slag "d" is crushed into grains having a diameter of several mm while being conveyed by the slag conveyor 14. The purpose of the high-temperature combustion in the swirling-type melting furnace 9 is also to decompose Dioxins and Dioxin precursors, and hence a total volume of the primary combustion chamber 10 and the secondary combustion chamber 11 is designed such that the retention time of gas therein is 0.5 second or more. The exhaust gas "h" discharged from the swirling-type melting furnace 9 passes through a series of heat recovery devices or dust removing devices such as a waste heat boiler, an economizer, or an air preheater, and then is discharged to the atmosphere. The respective combustion chambers in the swirling-type melting furnace 9 are provided with burners for start-up.

Figure 2:
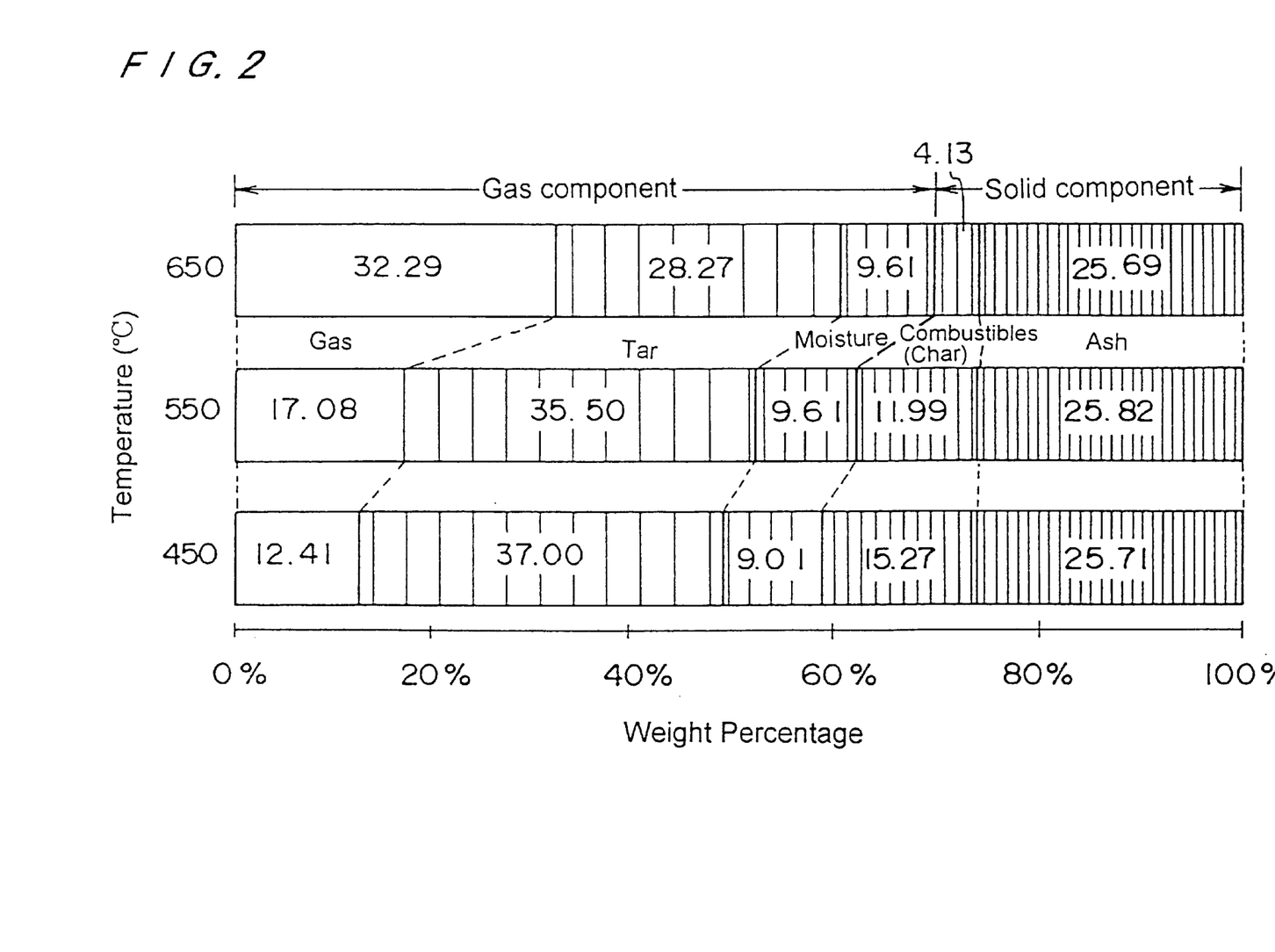
FIG. 2 is a graph showing the relation between percentage of various products and temperature when wastes are pyrolyzed.

FIG. 2 is a graph showing the relation between percentage of various products and temperature when wastes are pyrolyzed. According to FIG. 2, it was confirmed that the yield of gas increased by performing the secondary combustion in the freeboard of the gasification furnace. As the percentage of gas generated in the gasification furnace increases, the melting furnace can be small-sized. The reason why is that the gas is combusted instantaneously in the subsequent melting furnace.

As described above, according to the present invention, the fluidized-bed gasification furnace and the melting furnace are combined, and the primary combustion is carried out in the fluidized-bed of the gasification furnace, the secondary combustion is carried out in the freeboard, and then the high-temperature tertiary combustion is carried out in the melting furnace to thus convert ash content into molten slag and decompose Dioxins. Therefore, the present invention offers a next generation waste treatment technology which is excellent in simplicity, compactness, material recycling, energy recycling, environmental conservation, and still more improvement of simplicity and safety in operation.

INDUSTRIAL APPLICABILITY

The present invention relates to a technology for treating solid wastes or fuel derived from solid wastes such as municipal waste, refuse-derived fuel, solid-water mixture, plastic wastes, waste FRP, biomass wastes, or shredder dust (waste automobile, electric appliances, or the like), and is preferably applicable to waste treatment.

What is claimed is:

1. A method for treating solid wastes by pyrolysis gasification in a fluidized-bed gasification furnace, and then high-temperature combustion in a melting furnace, characterized in that:

a primary combustion in a fluidized-bed of said gasification furnace is carried out at a temperature of 600±50° C., a secondary combustion in a freeboard of said gasification furnace is carried out at a temperature of 725±75° C. by blowing air into a portion immediately above said fluidized-bed, and a tertiary combustion in said melting furnace is carried out at a temperature higher than a fusion temperature of ashes by 50 to 100° C.;

an oxygen ratio (a ratio of an amount of oxygen supplied for combustion to a theoretical amount of oxygen for combustion) in said primary combustion is in the range of 0.1 to 0.3, an oxygen ratio in said secondary combustion is in the range of 0.05 to 0.1, an oxygen ratio in said tertiary combustion is in the range of 0.9 to 1.1, and a total oxygen ratio is about 1.3.

2. A method according to claim 1, wherein an amount of oxygen-containing gas for said primary combustion in said fluidized-bed of said gasification furnace is in the range of 400 to 1700 $Nm^3$/hr per one square meter of bed area.

3. A method according to claim 1, wherein in said tertiary combustion in said melting furnace, said high-temperature combustion at a temperature higher than a fusion temperature of ashes by 50 to 100° C. is retained for 0.5 second or more.

4. A method according to claim 1, wherein in a slag separation chamber of said melting furnace, a space velocity of exhaust gas is 6 m/sec or less.

5. A method according to claim 1, wherein a fluidized medium used in said gasification furnace comprises sand having a diameter of 0.4 to 0.8 mm.

6. A method according to claim 1, wherein a height of said fluidized-bed of said gasification furnace is in the range of 1.0 to 1.5 times an inner diameter of said fluidized-bed portion when said fluidized-bed is in a stationary state.

7. A method for treating solid wastes by pyrolysis gasification in a fluidized-bed gasification furnace, and then high-temperature combustion in a melting furnace, characterized in that:

a primary combustion in a fluidized-bed of said gasification furnace is carried out at a temperature of 600±50° C., a secondary combustion in a freeboard of said gasification furnace is carried out at a temperature of 725±75° C., and a tertiary combustion in said melting furnace is carried out at a temperature higher than a fusion temperature of ashes by 50 to 100° C.;

an oxygen ratio (a ratio of an amount of oxygen supplied for combustion to a theoretical amount of oxygen for combustion) in said primary combustion is in the range of 0.1 to 0.3, an oxygen ratio in said secondary combustion is in the range of 0.05 to 0.1, an oxygen ratio in said tertiary combustion is in the range of 0.9 to 1.1, and a total oxygen ratio is about 1.3;

a position of supply of oxygen-containing gas for said secondary combustion in said freeboard of said gasification furnace is within a height of 1000 mm from a surface of said fluidized-bed.

8. A method for treating solid wastes by pyrolysis and gasification in a fluidized-bed gasification furnace, and then high-temperature combustion in a melting furnace, characterized in that:

a primary combustion in a fluidized-bed of said gasification furnace is carried out at a temperature of 600±50° C., a secondary combustion in a freeboard of said gasification furnace is carried out at a temperature of 725±75° C., and a tertiary combustion in said melting furnace is carried out at a temperature higher than a fusion temperature of ashes by 50 to 100° C.;

an oxygen ratio (a ratio of an amount of oxygen supplied for combustion to a theoretical amount of oxygen for combustion) in said primary combustion is in the range of 0.1 to 0.3, an oxygen ratio in said secondary combustion is in the range of 0.05 to 0.1, an oxygen ratio in said tertiary combustion is in the range of 0.9 to 1.1, and a total oxygen ratio is about 1.3;

a space velocity of gas in said freeboard of said gasification furnace is 0.7 m/sec or more.

* * * * *

UNITED STATES PATENT AND TRADEMARK OFFICE
CERTIFICATE OF CORRECTION

PATENT NO. : 6,168,425
DATED : January 2, 2001
INVENTOR(S) : Shosaku FUJINAMI et al.

It is certified that error appears in the above-identified patent and that said Letters Patent is hereby corrected as shown below:

ON THE TITLE PAGE
Kindly change the title to read:

"[54] METHOD FOR TREATING SOLID WASTES BY GASIFICATION AND SLAGGING COMBUSTION SYSTEM"

Signed and Sealed this

Twenty-ninth Day of May, 2001

*Attest:*

NICHOLAS P. GODICI

*Attesting Officer*  *Acting Director of the United States Patent and Trademark Office*